Feb. 4, 1941.   W. T. JOCHUM   2,230,251
AERIAL PHOTOGRAPHIC CAMERA
Filed Oct. 27, 1934   7 Sheets-Sheet 1

INVENTOR
WILLIAM T. JOCHUM
BY Lyon & Lyon
ATTORNEYS

Feb. 4, 1941.    W. T. JOCHUM    2,230,251
AERIAL PHOTOGRAPHIC CAMERA
Filed Oct. 27, 1934    7 Sheets-Sheet 2

INVENTOR
WILLIAM T. JOCHUM
BY Lyon & Lyon
ATTORNEYS

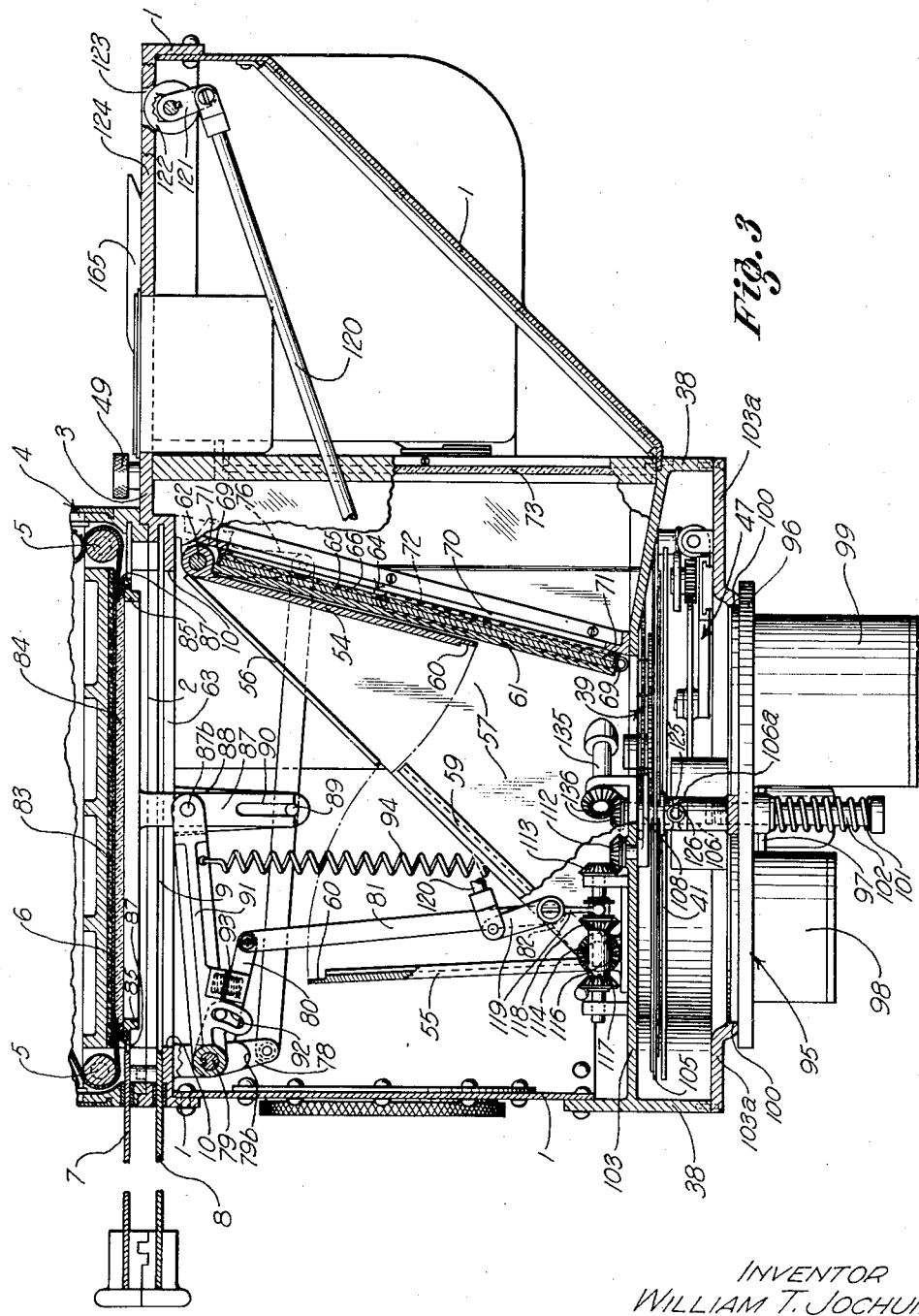

Feb. 4, 1941. W. T. JOCHUM 2,230,251
AERIAL PHOTOGRAPHIC CAMERA
Filed Oct. 27, 1934 7 Sheets-Sheet 4

INVENTOR
WILLIAM T. JOCHUM
By Lyon & Lyon
ATTORNEYS

Feb. 4, 1941.   W. T. JOCHUM   2,230,251
AERIAL PHOTOGRAPHIC CAMERA
Filed Oct. 27, 1934   7 Sheets-Sheet 5
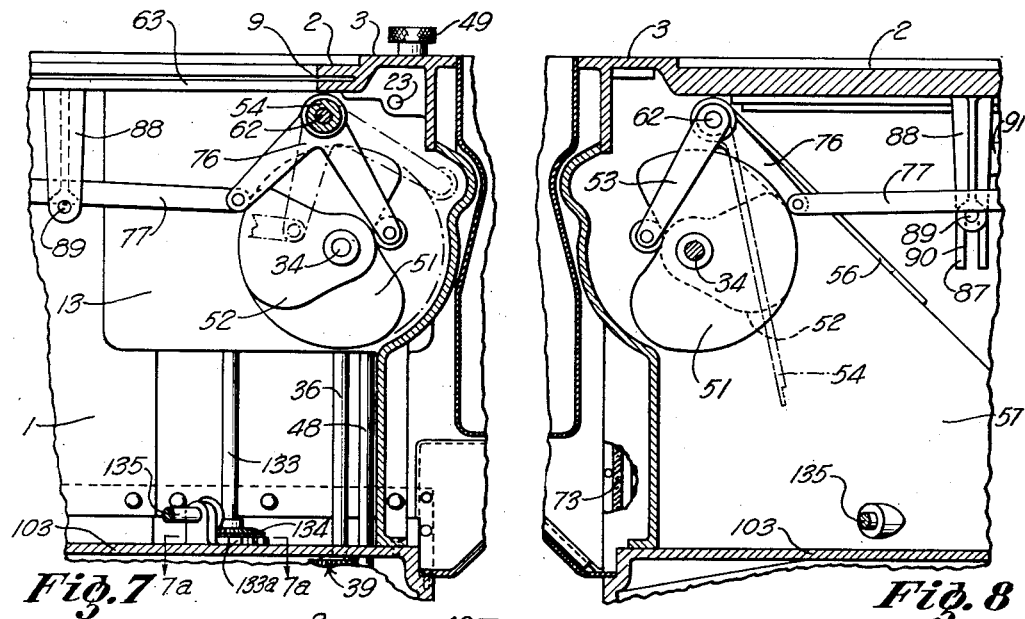
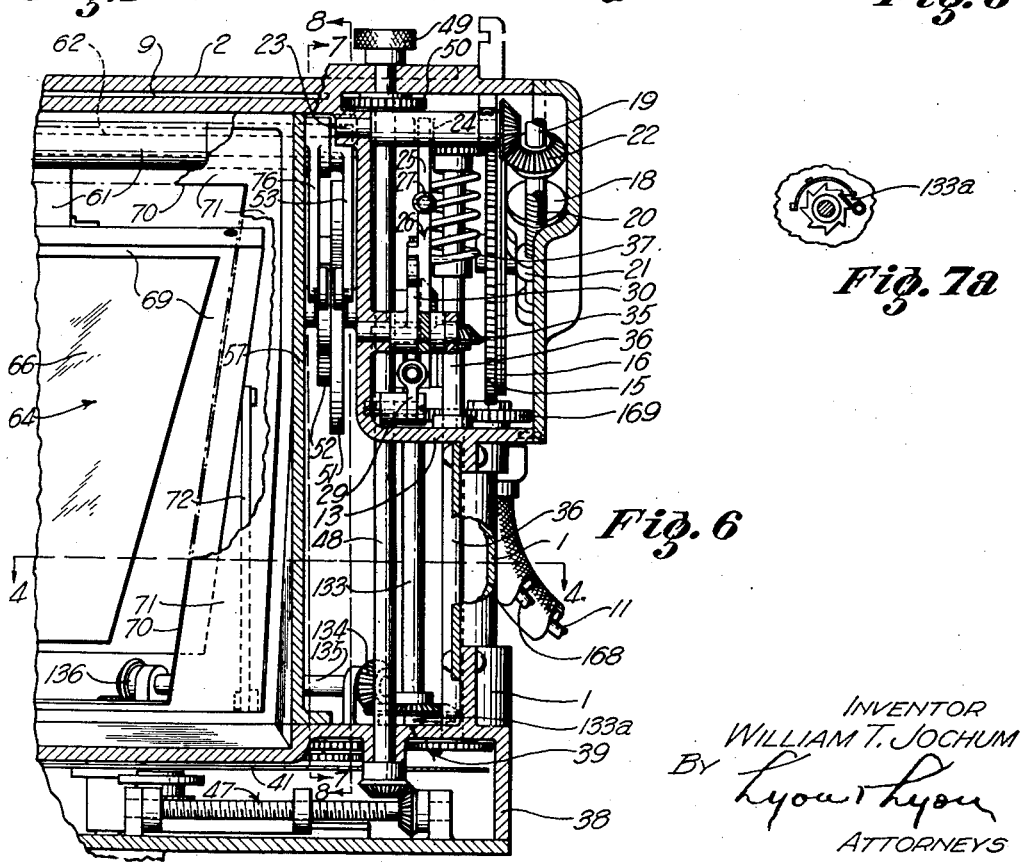
INVENTOR
WILLIAM T. JOCHUM
BY Lyon & Lyon
ATTORNEYS

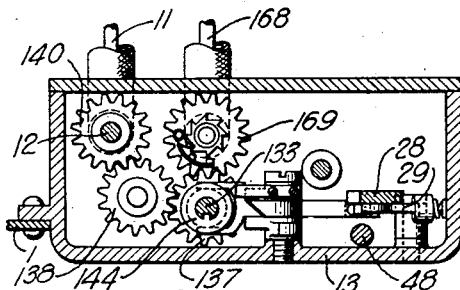
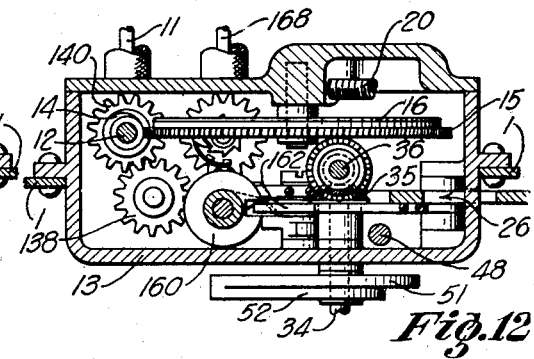
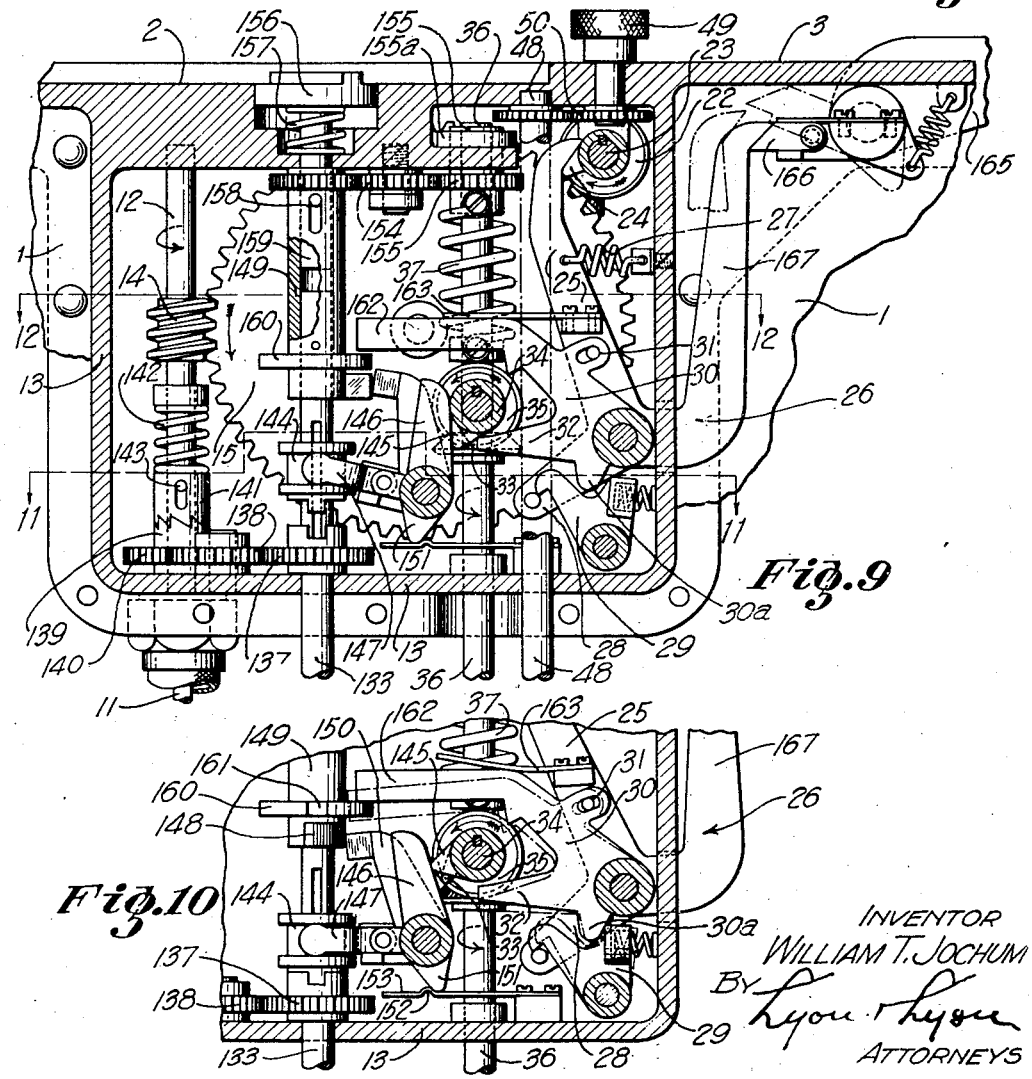

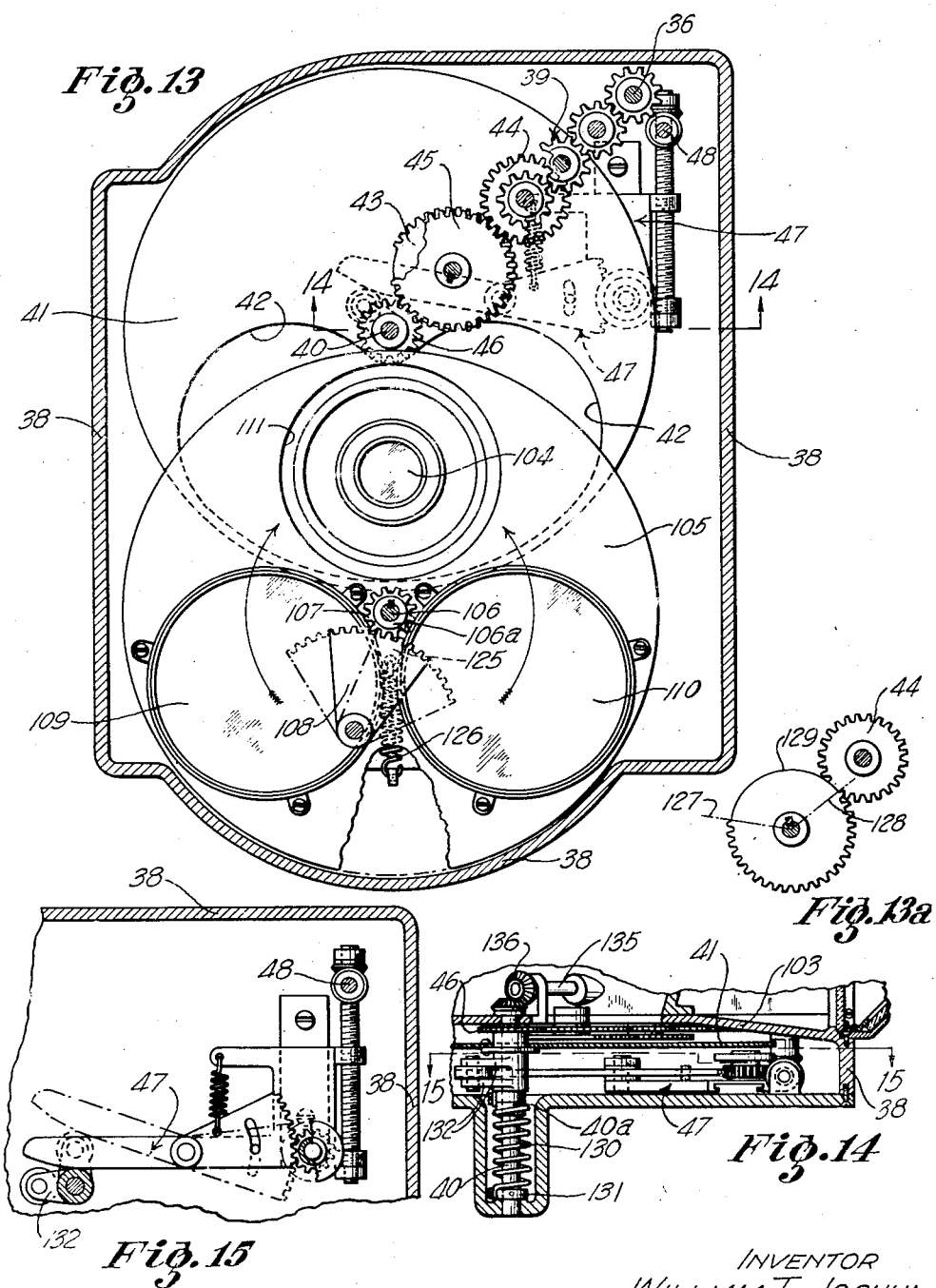

Patented Feb. 4, 1941

2,230,251

UNITED STATES PATENT OFFICE 2,230,251

AERIAL PHOTOGRAPHIC CAMERA

William T. Jochum, Manhattan Beach, Calif.

Application October 27, 1934, Serial No. 750,311

22 Claims. (Cl. 95—42)

This invention relates to a camera for taking pictures from an airplane, in rapid succession, to enable maps of the terrain to be prepared. More specifically, the improvements relate to a reflex type of camera, that is to say, one in which it is possible to see a reflected image of the terrain about to be photographed at any moment between the exposure periods. This entails the use of a viewing screen located in a lateral position with respect to the axis of the lens. One of the objects of the invention is to provide improved means for accomplishing this, and for effecting withdrawal of the laterally reflecting mirror during the exposure periods, and for simultaneously forming a light trap to exclude any side light that might find its way in to the lens through the viewing screen. A particular advantage gained through the application of the reflex mechanism herein disclosed is that the camera is thereby adapted for use as a drift sight, and the orientation of the camera by the camera oeprator is greatly facilitated through observation of the relative motion of the earth image on the viewing screen with respect to a radial line or lines provided on said screen as disclosed in my co-pending application, Serial No. 297,705.

A further object is to provide a presser plate or pressure plate for holding the light-sensitive film in the focal plane, and to provide a connection from the same to the control mechanism of the reflector.

A further object of the invention is to provide such a camera with control means for enabling light filter screens to be brought into use and interposed in the light beam at will; and to provide for holding the same normally in a withdrawn position while the camera-man is viewing the image on the viewing screen.

A further object of the invention is to provide an organization of the devices and parts for performing the functions referred to above, to the end that they will cooperate through a complete cycle to take a picture, or pictures, without interfering with the clearness of the image on the viewing screen; and so as to leave the parts at the end of the cycle, in proper relation for again viewing the image on the viewing screen.

Further objects of the invention will appear hereinafter.

The invention consists in the novel parts and combination of parts to be described hereinafter, all of which contribute to produce an efficient aerial photographic camera.

A preferred embodiment of the invention is described in the following specification, while the broad scope of the invention is pointed out in the appended claims.

In the drawings:

Fig. 3 is a view similar to Fig. 2, but taken about on the section line 3—3 of Fig. 1, but showing the reflector in the withdrawn position it assumes when an exposure is being made.

Fig. 6 is a vertical section on the line 6—6 of Fig. 1, through one side of the camera, particularly illustrating the control mechanism for the reflector and the flaps that form the light trap.

Fig. 7 is a fragmentary view, and is a vertical section taken about on the line 7—7 of Fig. 1 looking toward the right and showing the two cams and the cam levers that I prefer to employ for controlling the reflector and the light trap.

Fig. 7a is a detail of the detent pawl for a rewind spring at the line 7a—7a of ig. 7.

Fig. 8 is a section similar to Fig. 7, on line 8—8 of Fig. 1 but looking toward the left and showing the cams, but only the lever that controls the upper flap of the light trap.

Fig. 9 is a section about on the line 9—9 of Fig. 1, broken away, and particularly illustrating the driving mechanism of the machine that operates to drive the parts through an operating cycle.

Fig. 10 is a fragmentary view to be read with Fig. 9, and illustrating how the parts cooperate.

Fig. 11 is a horizontal section about on the line 11—11 of Fig. 9, illustrating the drive into the machine.

Fig. 12 is a section on the line 12—12 of Fig. 9. This view should be read in connection with Fig. 11, and illustrates the drive to the cams that control the reflector and the flaps of the light trap.

Fig. 13 is a horizontal section broken away, taken about on the line 13—13 of Fig. 2, showing the shutter in its open position and further illustrating the two light filters in their normal withdrawn position.

Fig. 13a is a detail of two meshing mutilated gears that cooperate to permit the shutter to rotate to make the exposure while the cam levers that control the reflector and light trap are on the dwells of their cams.

Fig. 14 is a fragmentary vertical section through the bottom wall of the camera and illustrating the rewinding mechanism for the shutter spring and incidentally showing the retarding mechanism for lengthening the exposure period while the rotation of the cams is momentarily arrested by the mutilated gears shown in Fig. 13a.

Fig. 15 is a fragmentary plan section illustrating retarding means that may lengthen the exposure while the control cams for the reflector are arrested in their rotation by the mutilated gears.

The drawings illustrate an embodiment of my invention applied to the aerial camera of my invention.

Figure 1:
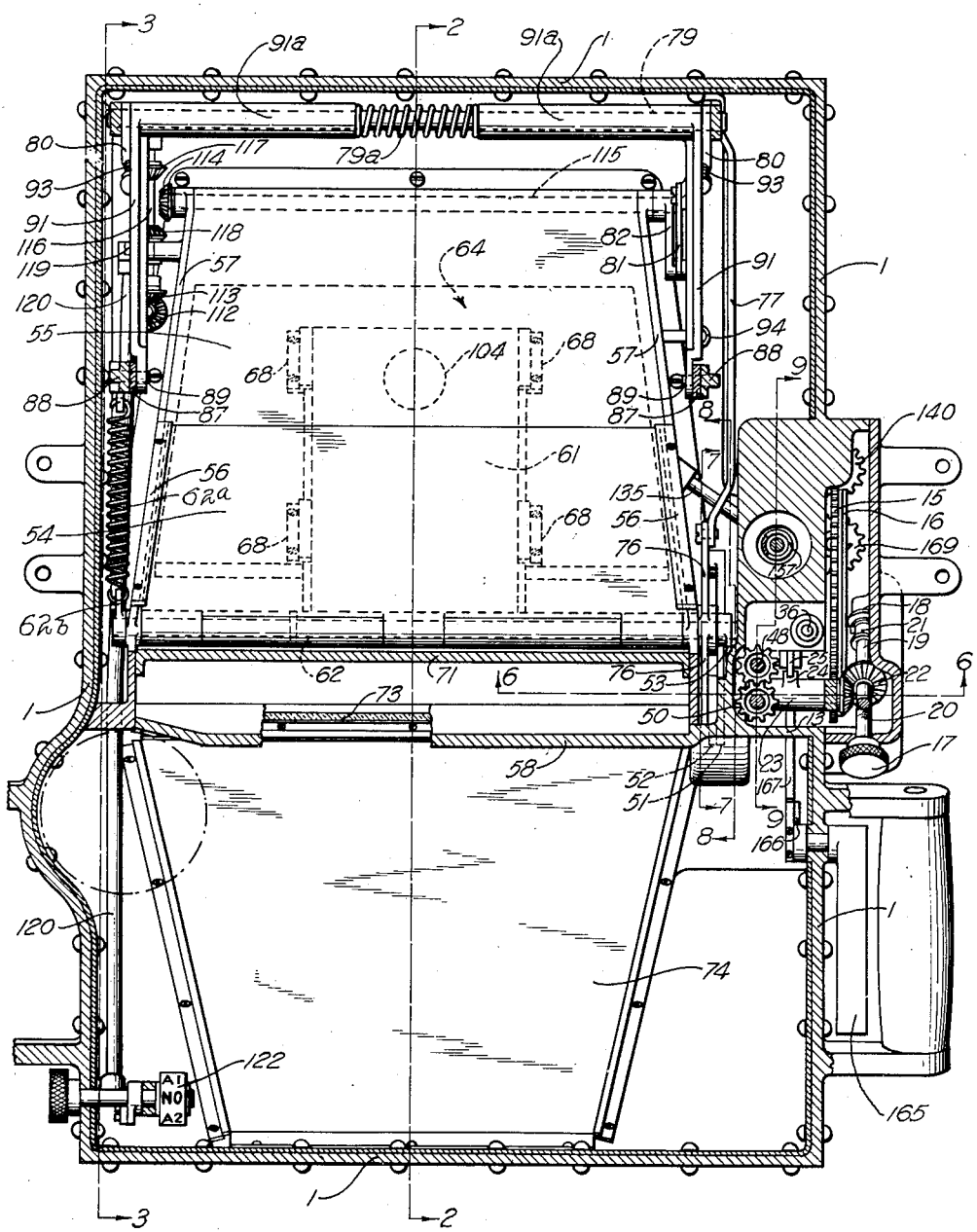
Fig. 1 is a horizontal section through the camera taken about on the line 1—1 of Fig. 2, certain parts being broken away. This view shows the parts in their normal position with the reflector interposed above the lens in the light beam, so as to reflect the viewing image onto the laterally located viewing screen.
Figure 2:
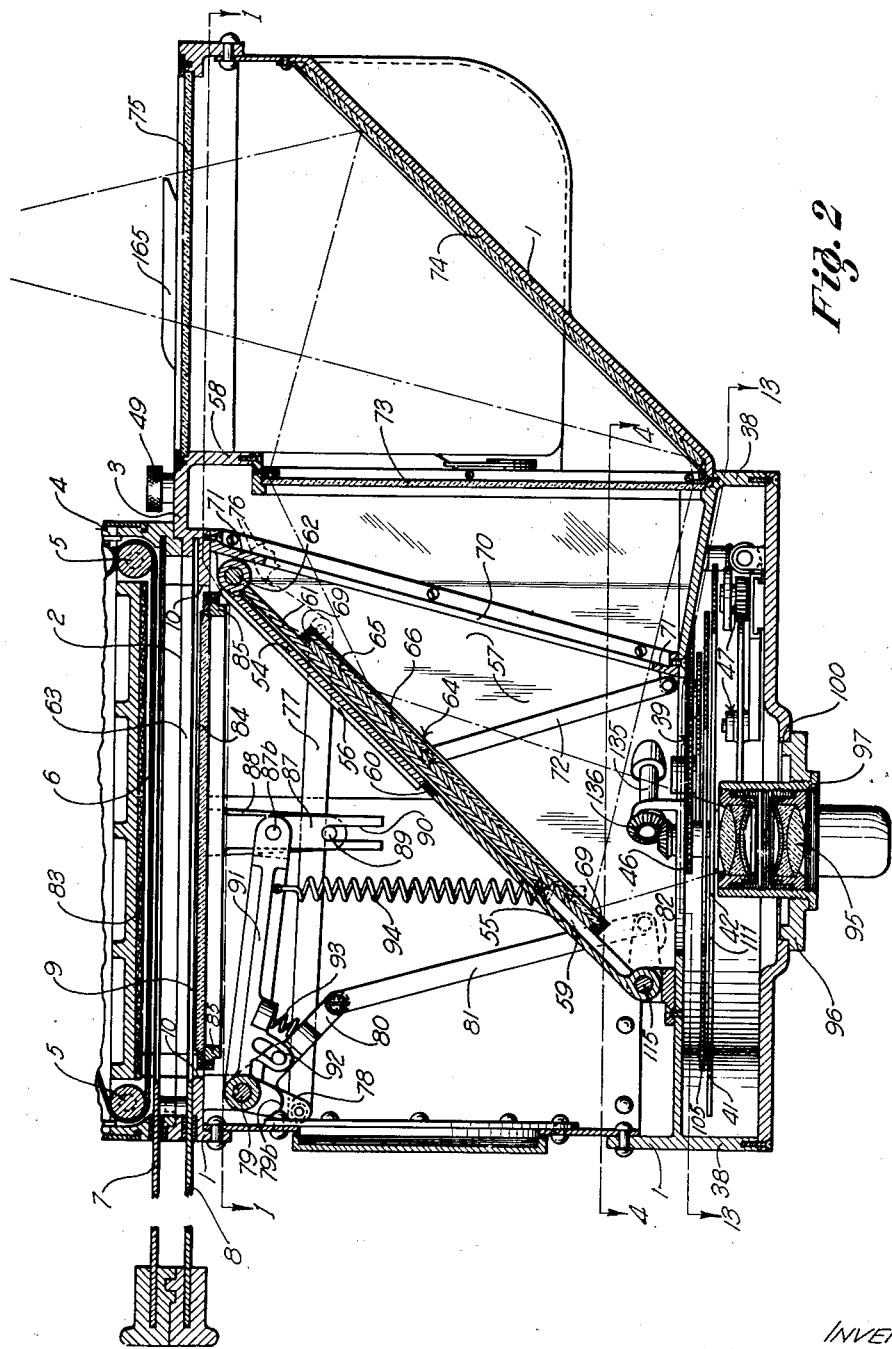
Fig. 2 is a vertical section through the camera broken away above, taken about on the line 2—2 of Fig. 1 and passing through the axis of the lens.

Referring particularly to Figs. 1, 2 and 3, this camera includes a casing 1 of box-form, having a seat 2 in its upper wall 3 at which a film-carrier 4 is mounted, said film-carrier being provided with guide rollers 5 around which the film passes so as to present a field or length 6 at which the exposure is made. The bottom of the film-carrier is provided with a light stop in the form of a slide 7 that may be slid into place to prevent any possibility of any light reaching the film when the camera is not in use. When the camera is in use, this light stop is withdrawn as indicated in Fig. 2. A similar light stop 8 is provided in the form of a shutter that may slide in and out in the guide groove 9 adjacent the upper wall 3 of the casing 1. When this light stop 8 is held withdrawn as indicated in Fig. 2, the film 6 is exposed to the light beam coming up through the casing 1 and through the light opening 10.

In the operation of this camera, a continuous power drive is employed, which operates the tripping mechanism so constructed that the interval between the moments at which the camera is tripped to make an exposure, can be regulated as desired. At the instant that the camera is tripped to make an exposure, automatically operating mechanism within the camera, operates the shutter to make the exposure. In the normal position of the parts, the shutter is in its open position, and a light-proof reflector device is interposed between the lens and the film, operating to reflect the image laterally to a viewing screen such as a ground glass plate. When the power drive mechanism trips the camera to make the exposure, the automatic mechanism within the camera temporarily closes the shutter, and while the shutter is closed, the light-proof reflector device opens up to permit the light beam to pass upwardly through the lens onto the film, and parts of this device move over to one side and form a light trap to cut off any side light that might come into the camera through the viewing screen.

The present invention particularly relates to the features of construction of this camera that involve the reflector means, and the light trap and its features of construction that enable it to cooperate with the other parts of the camera throughout the exposure cycle, so that after an exposure has taken place, the film feed will operate to advance the new field or frame on the film for exposure, and return all the parts to their normal position.

The present invention also includes light filter means that is normallly held clear of the axis of the lens so as not to interfere with viewing the terrain, but which, optionally, is connected for automatic operation in synchronism with the shutter and the reflector device and light trap so that if a light filter is being used, it will be thrown automatically into operation at the moment that the exposure is being made.

The general construction of the camera and its automatic mechanism will now be described.

The camera mechanism includes continuously driven mechanism for periodically tripping the automatic mechanism. Referring to Fig. 9, the continuous drive enters the machine through a flexible drive shaft 11 that connects to the vertical shaft 12 in a small housing 13 that forms a part of the casing of the instrument. Through a worm 14 on the shaft 12 a worm wheel 15 is continuously driven in the direction indicated by the arrow and this worm gear has a friction disc 16 on one of its faces (see Fig. 12). Through the medium of a thumb 17 (see Fig. 1) a driven friction wheel 18 contacting with the wheel 16 on an inclined countershaft 19, can be driven at any desired speed depending upon the position at which the driven wheel 18 is located, as may be determined by the seating of the thumb head 17. In other words, the thumb head 17 rotates the threaded shaft 20 shown in Fig. 12, and this determines the position of the rider 21 (see Fig. 1) on this screw that carries the driven wheel 18. Through bevel gears 22 a trip shaft 23 (see Fig. 9) is continuously driven, said trip shaft carrying a tripping dog 24. An arm 25 of a trip lever 26 is constantly held in the path of the tripping dog 24 by means of a coil spring 27. Each time the tripping dog 24 strikes the arm 25 it displaces the arm and starts the automatic mechanism of the camera to make an exposure, and after the exposure has been made, this arm is returned automatically in the path of this dog. When the tripping dog 24 throws the arm 25 to the left (see Fig. 9), the latch arm 28 on this lever 26 swings downwardly and is engaged by a spring-actuated latch 29 to hold the lever 26 in the position to release the automatic mechanism of the camera. In Fig. 10 the latch 29 is indicated holding this tripping lever in the locked position.

Referring particularly to Fig. 10, the trip lever 26 carries a dog plate 30 that is pivoted with the trip lever 26 for lost motion through the medium of a pin-and-slot connection 31. This dog plate has a substantially horizontal dog 32 at its lower end that is normally in the path of a detent pawl 33 riding on a detent shaft 34. This detent shaft 34 is connected by two bevel gears 35 with a vertical drive shaft 36 that is impelled to rotate in the direction indicated by the arrow, through the agency of a coaxial coil spring 37. As indicated most clearly in Figs. 6 and 13, this drive shaft 36 extends down into a bottom housing 38 where it drives a gear train 39 that finally drives the shaft 40 of the shutter 41, the shutter being in the form of a disc with an aperture 42 formed therein. This aperture is substantially kidney-shape, as illustrated in Fig. 13. The gear train 39 includes idlers adjacent to the drive shaft 36, but near the shutter shaft 40 it includes a large gear 43 that is a mutilated gear but twice the diameter of the pinion 44 that drives the same (see Fig. 13a). The large mutilated gear 43 is rigidly connected with an upper gear 45 that drives the shutter shaft 40 by meshing with pinion 46 on this shaft.

In connection with the shutter 41 the camera has retarding mechanism 47 indicated in dotted lines in Fig. 13, and more or less in detail in Fig. 14. This mechanism is not directly related to the invention as covered by the claims in this specification, and it is therefore unnecessary to describe the same in detail, except to say that the function of this retarding mechanism is to show up the rotation of the shutter and increase the exposure time; and the operation of this retarder mechanism in the camera illustrated, is controlled through the agency of a vertical shaft 48 (see Fig. 13) that can be rotated at will through the agency of a thumb head 49 (see Fig. 9) that can rotate the retarding shaft 48 through gear wheels 50.

The detent shaft 34 not only performs the function of the detent shaft, but also carries the control cams 51 and 52, the latter of which is the smaller cam, and this cam operates a cam arm 76 (see Fig. 8) that is rigidly connected with a sleeve which extends through wall 57 and which is integral with one of the flaps 54 of a two-part light trap construction (see Figs. 2 and 3). This light trap device includes this flap or wing 54, and another wing or flap 55 that is rotatably mounted near the bottom of the camera as illustrated in Fig. 3. In this view the flap 55 is swung into an inactive position to clear the space below the film to permit the beam to pass up through the lens and impinge upon the film. Means for operating the flap 55 will be described later.

Reference is now had to Fig. 2, that shows the flap 54 disposed in an inclined or diagonal position with the upper side of the flap against a stop strip or cleat 56. There is a cleat 56 disposed along the upper edge of a side wall 57 of substantially triangular form, that forms a space in which the flap 54 swings between the position indicated in Fig. 2, and the position indicated in Fig. 3. In the former position indicated in Fig. 2, the flaps 54 and 55 cooperate to intercept light coming up through the lens, and cooperate with reflector 64 to enable the image carried in the light beam, to be reflected over through a lateral frame 71 of the camera, to a viewing screen, as will be presently described. When the flap 54 is in the position shown in Fig. 2, the flap 55 is folded down against a stop or cleat 59 that holds the flap 55 in the same plane with the flap 54; and in order to insure their making a light-proof connection, the adjacent edges of these flaps are formed with transverse rabbet grooves 60, which enable the flaps to overlap each other and form a joint that will intercept the light. A spring 62a (see Fig. 1) secured to arm 62b on shaft 62 holds cam arm 53 against cam 51.

Figure 5:
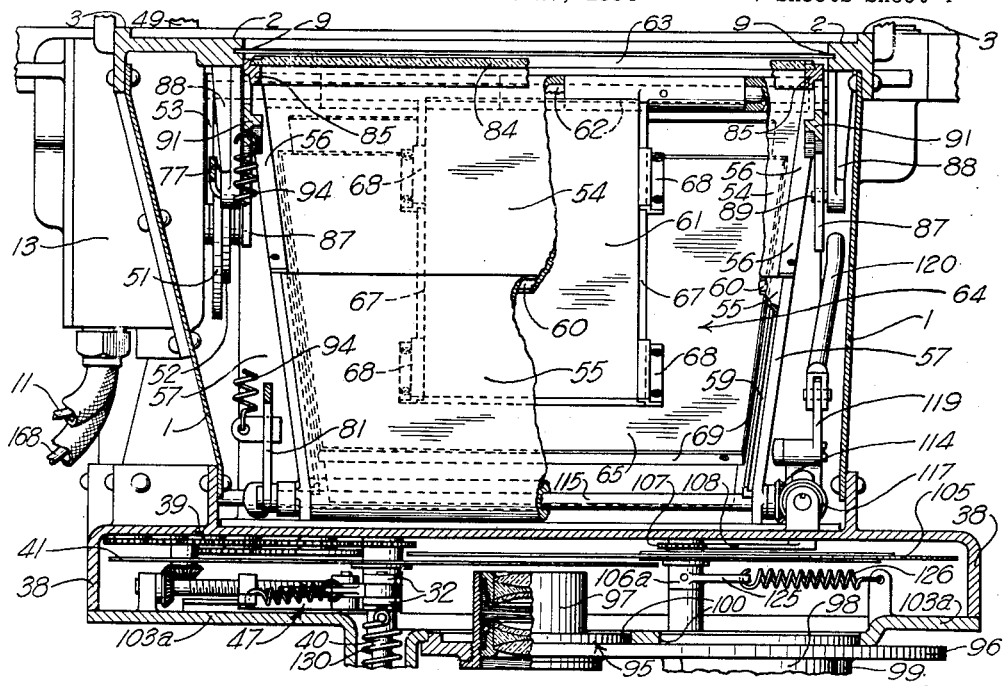
Fig. 5 is a vertical section taken about on the line 5—5 of Fig. 4, certain parts broken away, and particularly illustrating the relation of the light filters and their operating mechanism, to the shutter.

The carrier 61 is associated with a movable reflector which swings to and fro with the carrier 61 and which reflects the image over to the viewing screen. The construction employed for this purpose will now be described. The carrier referred to for the reflector, is in the form of a plate 61 that is rigid with a cross shaft 62 that is mounted for rotation toward one side of the light opening or window 63 (see Fig. 3) through which the light beam passes up to the film. Mounted to slide on the under face of this carrier as indicated in Fig. 5, a reflector 64 is provided, including a backing plate 65 and a silvered glass reflector or mirror 66. As indicated in Fig. 5, the side edges 67 of the carrier plate 61 have rabbet grooves to engage cleats 68 that are attached to the upper face of the backing plate 65 of the mirror, and the mirror 66 is held in a four-sided frame 69 which is shaped to seat against a similarly shaped light opening 70 (see Fig. 2) through which the light beam is reflected from the mirror when the mirror is in the position shown in Fig. 2. However, when the exposure of the film is taking place, this mirror and backing plate are seated on the edge of the frame 71 that has this opening 70 thereby shutting off any ingress of light into the light well through the camera, that might otherwise come in through the viewing screen; also while the mirror is moving from reflecting position (see Fig. 2) to exposure position (see Fig. 3). In order to lift the sliding reflector to clear certain parts of the mechanism to be described hereinafter, the reflector frame is provided at each side with a link 72. The upper ends of these links are pivotally attached to the side of the reflector frame (see Fig. 6) and the lower ends are pivotally secured on lugs that project inwardly from the lower portions of the frame 71. With this construction it will be evident that as the reflector swings from the position indicated in Fig. 2 toward that shown in Fig. 3, the link 72 will slide the reflector upwardly on the reflector carrier, and permit it to seat against the inner side of the frame 71.

In the position of the reflector indicated in Fig. 2, the light beam passes up through the lens and is reflected in a substantially horizontal direction as indicated graphically in Fig. 2, so that the light impinges upon a viewing screen 73, or ground glass set in the lateral wall 58 (see Fig. 2), the viewing screen being observed in conjunction with an inclined reflector 74 located below window 75 which, of course, would be of transparent glass or equivalent material suitable for this purpose.

Referring again to Figs. 7 and 8, the other cam 52 controls a cam lever 76 of bell crank form, the other arm of which is connected to a link 77 that extends over to the other side of the camera (see Fig. 2) where it is pivotally secured to a lever 78 carried on a shaft 79 which is parallel to the shaft 62 and located on the other side of the light window 63 below the film. This lever 78 is also a bell crank lever having a long arm 80 that is connected by a link 81 with an arm 82 that is rigidly connected with the lower flap 55 of the light trap assembly, and which has already been described.

When the camera is set for exposing a film (see Fig. 3) the film 6 is yieldingly pressed up against a back stop 83 by means of a presser plate or pressure plate device 84, the body of which is of transparent material such as glass, and carried in an open frame 85, the edges of said frame being provided with guide brackets 87 guided on fixed guide posts 88 that project down from the lower edge of the frame around the light window 63. The fixed posts 88 have transverse pins 89 that are located in vertical slots 90 carried by the guide brackets or guide arms 87. In order to raise the presser plate 84 to its active position indicated in Fig. 3, two levers 91 are provided (see Fig. 2) that are slidably mounted but non-rotatable on the shaft 79 and have a lost motion pin and slot connection 92 with the arms 80 that are actuated by the lever arm 78. Between the arms 80 and the arms 91, coil springs 93 are provided. This enables spring pressure to be applied which will prevent any danger of breaking the presser plate. The presser plate is normally held down in an inactive position by a coil spring 94 (see Fig. 2).

The camera illustrated, includes a lens assembly 95 (see Fig. 3) including a disc 96 on the under side of which three lens barrels 97, 98, and 99 are carried. This disc is pressed up yieldingly against seats in the bottom openings 100 of the camera, there being an opening corresponding to the seating boss for each lens unit, by a coil spring 101 carried on a downwardly projecting post 102 that extends down from a boss in lower cover plate 103a of the camera. This construction enables the disc 96 to be manually rotated to bring any one of the lens barrels in line with the central axis up through the camera. This active lens position is indicated by the dotted circle 104 in Fig. 1.

In Fig. 13 I illustrate a filter device which can be brought into operative position with respect to the active lens 104, and this filter device is normally held in a clear position, that is to say, out of line with the active lens and the aperture 42 through the shutter 41. This filter device includes a disc 105 mounted for rotation on sleeve 106a, that is fast on a centrally disposed shaft 106, that is co-axial with post 102 (see Fig. 3). Pinion 107 is also fast on shaft 106 and meshes with a sector 108. In the normal position of this sector, two filter screens 109 and 110 are held in a neutral position as indicated in Fig. 13, but if the sector or segment 108 is moved in the proper direction, either one of these filters can be brought around into alignment with the lens. Of course, in the neutral position of the disc 105, the lens is left clear by means of a large opening 111 formed in the disc. The movement of these two filter screens 109 and 110 into position aligning with the lens, is indicated by the two arrows in Fig. 13.

Referring to Fig. 3, it will be noted that the segment 108 is secured to a stub shaft passing through the false bottom 103 and carrying a bevel gear 112 above the false bottom, that meshes with an actuating bevel gear 113. This bevel gear 113 may be rotated in either direction automatically through the agency of a driving bevel gear 114 that is rigidly secured on the end of shaft 115 that is the same shaft that carries the rocker lever 82 (see Fig. 2). The bevel gear 113 is rigid on a shaft that carries a slidable clutch sleeve 116, said clutch sleeve being splined on the shaft of the bevel gear 113 and carrying two opposite bevel gears 117 and 118. When the bevel gear 118 is in mesh with the bevel gear 114, of course, the bevel gear 113 will be rotated in an opposite direction from the direction it would have if the bevel gear 117 were in mesh. As illustrated in Fig. 3, however, the clutch sleeve 116 is in a neutral inoperative position with neither one of the bevel gears in mesh, so that neither of the filter screens 109 or 110 would be operated automatically when the shaft 115 rotates. However, I provide means for setting the clutch at will to determine which one of the filter screens is operated automatically to come into line with the lens when the exposure is made, and to be withdrawn after the exposure has taken place. For this purpose I provide a clutch lever 119 controlled by a long diagonal link 120 (see Fig. 3), the upper end of which is attached to a lever 121 rigidly connected to a filter indicator in the form of a wheel 122, the upper face of which is exposed through a window 123 in the cover plate 124. This indicator is shown in plan in Fig. 1. It has connections "A1" and "A2" upon it corresponding to the different filter screens, and between these legends a legend "No" is provided to indicate when the filter device would be in its neutral and inactive position. The shaft of this indicator carries a thumb head for rotating the same, as indicated in Fig. 1.

Means is provided for normally holding the filter device in its neutral position. For this purpose the sleeve 106a is provided with a radial arm 125 to which a coil spring 126 is attached.

In the camera illustrated, the shutter 41 is constantly urged to rotate by its own spring, but when the drive through the gear train 39 (see Fig. 13) is not arrested at the mutilated gears 43 and 44 (see Fig. 13a) the shutter is also urged to rotate by the main actuating spring 37 (shown in Fig. 9). However, it should be understood that the gears 43 and 44 constitute an escapement device, and when they are in the relation shown in Fig. 13a, the gear 43 locks the gear 44 against rotation but is itself independently movable throughout the angle between the radial lines 127 and 128, which mark the angular extent of the plane face 129 at the mutilated point of the gear 43. This enables the rotation of the shutter to be independent of the main drive, besides permitting the shutter to accelerate free of the reflex mechanism for the purpose of obtaining exposures of minimum time duration while employing a minimum amount of driving power.

Figure 4:
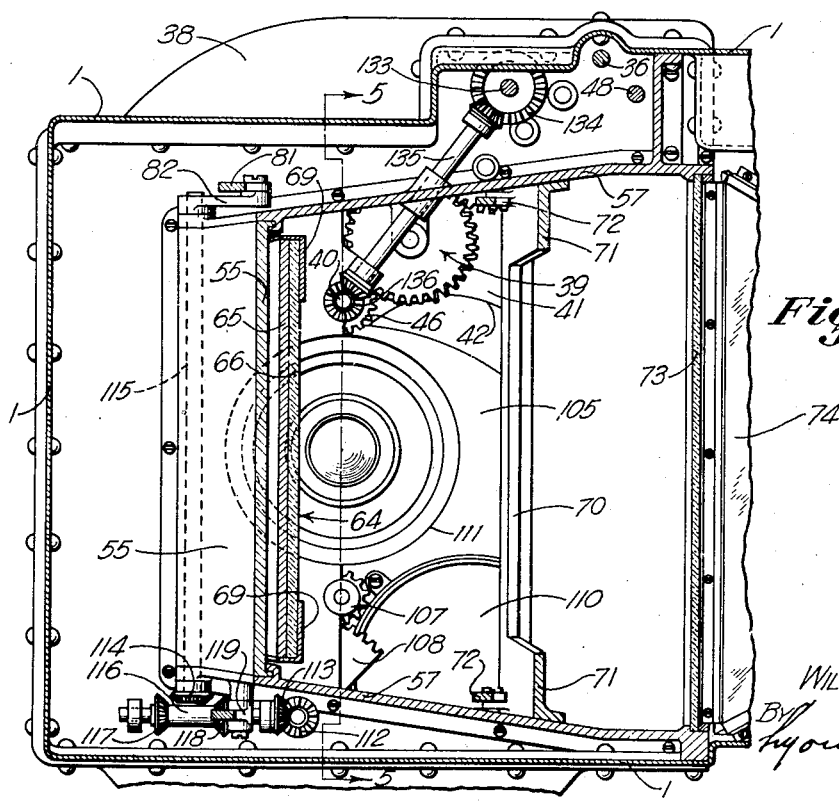
Fig. 4 is a horizontal section taken about on the line 4—4 of Figs. 2 and 6, with the right-hand portion of the view broken away. This view particularly illustrates the means for determining which one of two light filters is to cooperate in taking a picture, the clutch being shown, however, in a neutral position, as would be the case if no filter is being used at the moment.

Referring to Fig. 14, the shaft 40 already described, carries a coil spring 130, the lower end of which is secured on a collar 131 rigid to the shaft. The upper end of this spring impels retarder arms 132 of the retarder assembly 47 already referred to, which arms are rigid with the shutter 41 and are also rigid with the pinion 46, being supported on shaft 40 by collar 40a that is fast to shaft 40. It is unnecessary to describe the specific construction of the retarder mechanism as that mechanism is not related directly to the invention covered by the claims in the present patent. The shutter spring 130 in the present camera, is rewound through the agency of a vertical shaft 133 (see Figs. 4 and 9) the lower end of which is connected by bevel gears 134 that drive a countershaft 135, and this countershaft rotates the shaft 40 in the proper direction for rewinding the spring through the agency of bevel gears 136. A ratchet mechanism 133a (see Fig. 7a) is provided on shaft 133 to prevent springs 37 and 130 from backing up and unwinding when the rewind clutch 144 disengages upon completion of the rewind cycle. Referring again to Fig. 9 and also to Fig. 10, the rotation of the shaft 133 for rewinding the shutter spring, is effected through the agency of a gear wheel 137 that is loose on the shaft, but continuously driven from an idler 138 that is driven through the agency of a collar 139 on the aforesaid shaft 12, and which carries a gear wheel 140 meshing with the idler. On the shaft 12 a one-way drive clutch 141 is provided, including a coil spring 142 and a pin-and-slot connection 143, for a purpose that will appear hereinafter. The rewinding movement to the shaft 133 is imparted from the gear wheel 137 through a clutch collar 144 splined on the shaft 133. This clutch is closed automatically at the proper moment in the cycle through the agency of a cam toe 145 on the shaft 34 that engages a rocker arm 146 rigid with a yoke 147 that shifts the collar 144. After the rewind occurs, this clutch collar 144 is automatically connected up to open the clutch by an inclined cam face 148 on a collar 149 that is rigidly secured on the upper end of the shaft 133. In order to accomplish this, the inclined cam face 148 engages a similar inclined cam face on a cam lever 150 that is rigid with the arm 146. The clutch collar 144 is held automatically yieldingly in either its open position or its closed position by means of a cam toe 151 that moves to and fro across an offset 152 in a leaf spring 153.

The rewinding of the spring 37 is effected through the agency of the upper end of the sleeve 149 through gear wheels 154, including a driven gear wheel 155 that is loose on the upper end of the shaft 36, the upper end of the spring 37 being attached to the sleeve of this gear wheel 155, said sleeve being supported in position by means of a collar 155a.

When the rewinding of the spring 37 and the shutter spring 130 occurs, the film 6 is automatically advanced by the rotation of a clutch head 156 that engages with a winding head on the film-box that seats on the casing 1. This clutch head is rigid on the shaft, but is pressed upwardly by a coil spring 157. This permits free up or down movement of the clutch head in making connection with the corresponding clutch head on the film-box. This movement is permitted by a pin-and-slot connection 158 between a stub shaft 159 that carries the head 156 and the sleeve 149.

Referring to Figs. 9 and 10, in the operation of the machine, when the cam toe 24 trips the lever 25 to start the instrument in operation, the detent plate 30 cannot drop down sufficiently to permit the detent pawl 32 to release the detent dog or pawl 33, unless the rewinding operations just described, have taken place. This is to insure that the film will be stationary and fully advanced before the exposure is made. In order to accomplish this in the camera illustrated, the sleeve 149 has a flange 160 having a notch 161, and unless this notch is in line with a finger 162 that extends over from the plate 30, the plate 30, of course, cannot drop down. Although the plate 30 might drop down in this way by gravity, it is urged to move downwardly when the trip lever 25 is tripped, by a leaf spring 163 that presses against the upper edge of the plate, as illustrated in Fig. 10.

When the winding is completed, the finger 162 drops down into the notch 161, and this permits a cam toe 164 on the under edge of plate 30, to release the spring latch 29. The spring 27 then pulls the trip lever 25 back to its normal position in the path of cam 24, ready to be tripped again for the next exposure.

The camera has a hand lever 165 (see Figs. 1 and 9) that may be operated at any time, to make an extra exposure imposed into the regular period between the automatic exposures effected through the continuous operation of the tripping cam 24. This hand lever has a spring-pressed toe 166 that operates an outer arm 167 of the trip lever 26. The camera illustrated also has a connection for rewinding the camera mechanism by hand. This includes a second flexible shaft 168 (see Fig. 11) that drives a pinion 169 meshing with the aforesaid gear wheel 137. When the camera is rewound through shaft 168, rotation of gears 138 and 140 is not transmitted to shaft 12 due to over-riding clutch action of collar 141. A generally similar over-riding ratchet in conjunction with gear 169 prevents rotational motion being transmitted to shaft 168 when the mechanism is being power driven through shaft 11.

In Figs. 1 to 3, the arms 91 that carry the presser plate 84 are preferably connected to the bracket arms 87 so that they can be readily disconnected. This is desirable because it makes the interior of the casing 1 more accessible. On this account, I prefer to form the arms 91 with hubs 91a splined to shaft 79 and forced apart by a coil spring 79a between them on the shaft. By pressing inwardly on the lugs 79b (see Fig. 2) their outer ends can be slipped off the pivot pins 87b that connect them to the bracket arms 87. The plate 84 can then be pulled up, which will disconnect the slots 90 from the guide pins.

In the operation of the camera, it should be understood that the parts are normally in the relation illustrated in Fig. 2, at which time the reflector 66 is in a position to intercept rays admitted to the camera casing through the objective, and these rays are reflected over onto the viewing screen 73. When the camera-man wishes to commence taking pictures, a prime mover (not illustrated), would be started in operation to drive the flexible shaft 11, thereby imparting rotation to the shaft 12 and thence to the worm wheel 15 and friction drive wheel 16. The camera-man also, by rotating thumb head 17 (see Fig. 1) would adjust the friction wheel 18 on the face of the driving wheel 15 to drive the trip shaft 23 (see Fig. 9) at the desired speed, so as to take pictures rapidly or slowly, as might be desired. At each revolution of the trip shaft 23, the trip cam toe 24 will actuate the tripping lever 26 moving its arm 25 toward the left as viewed in Fig. 9, and causing its latch arm 28 to be depressed, releasing detent 33. If the rewinding operation is not completed, however, lever 26 is automatically latched in the depressed position by the spring-actuated latch 29. As soon as the rewinding operation is completed, the groove 161 will permit the dog plate 30 to swing down on the pivot of the lever 26 so that the detent dog 32 will drop down out of the path of the detent pawl 33 on shaft 34. This will permit the drive spring 37 of the automatic mechanism to effect the rotation of the control cams 51 and 52 (see Figs. 1, 7 and 8). When dog plate 30 drops down, catch 29 is released by lug 30a on lever 26, permitting lever 26 to return to the normal position shown in Fig. 9. The rotation of the cams 51 and 52 first moves the mirror to the position shown in Fig. 3, and then will operate the two-part light trap composed of the two swing gates or flaps 54 and 55 (see Fig. 2) and in doing this will cause the wing or flap 55 to swing up into a nearly vertical position as indicated in Fig. 3. The other wing or flap 54 will swing toward the right and seat upon the reflector frame seated against the inner edge of the light trap frame 71, which thereby closes the opening 70 (see Fig. 2). After the exposure has taken place, the cams first cause the flaps 54 and 55 to move from the position shown in Fig. 3 to that shown in Fig. 2, and then the reflector is moved from the position shown in Fig. 3 to that shown in Fig. 2. This prevents any side light from coming into the camera through the viewing screen 75 at any time during an exposure cycle. In many circumstances, side light coming into the camera might prevent the taking of a perfect picture. This is particularly true where the camera is used for military purposes, for example, if light from a bursting shell above the camera, passed into the camera down through the viewing screen. As the carrier 61 swings over toward the frame 71 to close the opening 70 (see Fig. 2) the links 72 operate to slide the reflector 66 and its frame upwardly on the reflector carrier 61. This enables the lower end of the reflector to clear the bevel gears 136 (see Figs. 2 and 14). In other words, the mechanism coordinates the movements of the light trap and the reflector, the mechanism driven by the spring 37 operating as a control mechanism. This mechanism, however, is confined to move in one direction only, through a definite predetermined angle to effect the synchronized cycle of movements of all the camera mechanism that is driven by this spring; that is to say, it effects a complete sequence of movements and returns the parts to their normal position indicated in Fig. 2.

In addition to opening up the light well or space in the camera box below the film 6, the control mechanism actuated by the spring 37 through the vertical shaft 36 (see Fig. 13) accomplishes the function of synchronizing the operation of the reflex mechanism with the shutter by driving of the gear train 39 including the mutilated gears 43 and 44 (see Figs. 13 and 13a) which effect rotation of the rotary shutter 41 through, in the camera shown, an angle of 120° and closing the shutter while the mirror is moving from the position shown in Fig. 2 to the position shown in Fig. 3, and an additional rotational angle of 120° while the light flaps 54 and 55 are moving from the position shown in Fig. 2 to that shown in Fig. 3. The mutilated gears 43 and 44 then disengage to permit the shutter disc 41 to move through an angle of 240° to make the exposure. At this time, the shutter is driven forwardly solely by the energy in its own spring 130 (see Fig. 14). This enables the length of the period of exposure to be nicely regulated through control of the retarding means through the agency of thumb head 49 (see Fig. 9) the rotation of which will rotate vertical shaft 48. This will control the retarder mechanism 47 (see Figs. 6, 14 and 15). This mechanism is not described in detail, but provides means for engaging the short arm 132 that rotates with the shutter. Following the exposure, the mutilated gear teeth then re-mesh, and while disc 41 rotates an additional 120°, light flaps 54 and 55 are moved from the position shown in Fig. 3 to that shown in Fig. 2. During the final 120° rotational motion of disc 41, the mirror is moved from the position shown in Fig. 3 to that shown in Fig. 2, and the shutter re-opens. The shutter makes two complete revolutions for each exposure cycle, at the beginning and end of which it is in the position in which it is illustrated in Fig. 13. During the second revolution of the shutter, and after it has covered the lens, then the cams 51 and 52 which have been running on their dwells, then come into active operation again and swing the light trap and the reflector back from the position shown in Fig. 3, to that shown in Fig. 2. For a certain period of time the parts will remain in this position, enabling the camera-man to use the viewing screen between automatic exposures effected by the continuous rotation of the tripping shaft 23. If the camera-man wishes to take an extra picture at any time, he can do this by manual operation of the tripping lever arm 167 (see Figs. 1 and 9).

The filter mechanism is normally in a clear position, that is to say, the light filter screens 109 and 110 are in a withdrawn position as indicated in Fig. 13. The filter mechanism is constantly held in this position through the agency of spring 126 attached to a short arm 125 on the filter shaft 106, and of course, whenever the filter mechanism is operated, this spring urges it back to this clear position. The two screens 109 and 110 would, of course, be of different character, and the use of one or the other is optionally determined by the camera-man. This filter mechanism is controlled in synchronism with the shutter operating mechanism to assume an active position prior to exposure; that is to say, the mechanism can be set by the camera-man so that either one of the screens 109 or 110 may be selected for immediate use, and after this selection is made, the screen selected will be interposed at each exposure in the light beam. Which filter is selected is determined by shifting the clutch sleeve 116 (see Fig. 3) so that one or the other of the bevel gears 117 or 118 engages the driving bevel gear 114. This shifting of the clutch sleeve 116 is accomplished at will through the agency of the inclined link 120, the upper end of which is connected for rotation to the shaft of the indicator wheel 122 that is exposed in the window 123. Fig. 1 shows a thumb head on the end of this indicator shaft, for rotating the indicator wheel. The surface of the wheel is marked with legends corresponding to each of the filters, and also the legend "No" to indicate when the clutch is in its neutral position so that the filter will not be in use at all.

In the cycle of movement, near the end of the first revolution of shaft 34 (see Fig. 10) the cam 145 will operate through cam lever 146, to move the clutch member 144 down to clutch with continuously driven gear 137, thereby rotating sleeve 149 and thereby actuating gear 155 to rewind the spring 37. Upon completion of one full turn, the inclined face 148 on sleeve 149 disengages clutch sleeve 144 by moving arm 146 from the position shown in Fig. 10 to that shown in Fig. 9.

The lower end of shaft 133 drives countershaft 135 (see Figs. 4 and 14) to rotate shaft 40 to rewind shutter spring 130.

The rotation of sleeve 149 also rotates clutch head 156 (see Fig. 9) that advances the film 6 for the next exposure.

The presser plate 84 (see Fig. 2) is in its depressed position, of course, while the film 6 is being advanced for the next exposure. However, before the exposure occurs, the link 77 exerts a pull on lever 78 that is loose on shaft 79, thereby swinging arm 80 upwardly and causing spring 93 to press its corresponding arm 91 upwardly, said arm 91 and a corresponding arm at the other end of the shaft 79 operating through the bracket 87 to raise the presser plate and force it against the film 6, thereby pressing the film up against backing plate 83 and holding it accurately in the focal plane. In this upward movement, of course, the bracket posts 87 are guided in a substantially vertical position by the guide pins 89 and the slots 90.

I claim:

1. In a reflex camera mechanism, a lens, viewing means, means adjacent the focal plane of the lens for supporting a photographically sensitized surface, said viewing means having a movable reflector, interposed between the lens and the focal plane, a shutter mechanism, a light trap for obscuring the sensitized surface and movable to open position, and a control mechanism for causing the operation of the reflector, the shutter mechanism and the light trap, in synchronism to move the reflector and out of the path of the rays from the lens to the focal plane, to open the light trap, to operate the shutter mechanism through a cycle of exposure, and to return the light trap and reflector to viewing position.

2. In a reflex camera mechanism, a lens, viewing means, means adjacent the focal plane of the lens for supporting a photographically sensitized surface, said viewing means having a movable reflector, interposed between the lens and the focal plane, a shutter mechanism, a light trap for obscuring the sensitized surface and movable to open position, and a control mechanism having a rotary motion confined to move in one direction only and through a definite angle, for causing a complete sequence of motion of the reflector, the shutter mechanism, and the light trap.

3. In a reflex camera mechanism, a lens, viewing means, means adjacent the focal plane of the lens for supporting a photographically sensitized surface, said viewing means having a movable reflector, interposed between the lens and the focal plane, a shutter mechanism, a light trap for obscuring the sensitized surface and movable to open position, a movable pressure plate device for maintaining the sensitized surface truly in the focal plane during the exposure period, and a common control mechanism for causing the operation of the reflector, the shutter mechanism, the light trap, and the pressure plate device in synchronism to move the reflector out of the path of the rays from the lens to the focal plane, to open the light trap, to operate the shutter mechanism, and to operate the pressure plate device through a cycle of exposure and to return the light trap and reflector to viewing position and the pressure plate to inactive position.

4. In a reflex camera mechanism, a lens, viewing means, means adjacent the focal plane of the lens for supporting a photographically sensitized surface, said viewing means having a movable reflector, interposed between the lens and the focal plane, a shutter mechanism, a light trap for obscuring the sensitized surface and movable to open position, a movable pressure plate device for maintaining the sensitized surface truly in the focal plane during the exposure period, and a common control mechanism having a rotary motion confined to move in one direction only and through a definite angle, for causing a complete sequence of motion of the reflector, the shutter mechanism, the light trap, and the pressure plate device.

5. In a reflex camera, a lens, a viewing means adapted to form an image by the aid of the lens, a movable shutter mechanism, a movable filter mechanism, having a clear position out of the path of the image rays from the lens, as well as a plurality of filtering positions, means for predetermining which of the filtering positions is to be used during the exposure period of the shutter, and means responsive to shutter operation for moving said filter mechanism to its predetermined position.

6. In a reflex camera, a lens, a viewing means adapted to form an image by the aid of the lens, a movable shutter mechanism normally open during viewing position, a movable filter mechanism having a clear position out of the path of the image rays from the lens to permit said viewing means to be utilized without reduction of light for the image, means constantly urging said filter mechanism toward said clear position, said filter mechanism having a plurality of light passing positions including a filtering position, means for operating the viewing means and the shutter mechanism to cause an exposure, and means whereby said operation causes the filter mechanism optionally to move to a filtering position prior to exposure and in opposition to said constantly urging means 7. In a reflex camera, a lens, a movable viewing means adapted in one position to form an image by the aid of the lens, and in another position to permit the exposure of a sensitized surface, a movable shutter mechanism, adapted to cause an exposure during the period when the viewing means is in permissive position, means for causing said viewing means and shutter mechanism to operate through an exposure cycle, a movable filter mechanism, having a clear position out of the path of the image rays from the lens to permit said viewing means to be utilized without reduction of light for the image, said filter mechanism also having a filtering position, means constantly urging said filter mechanism to clear position, means for optionally predetermining which one of the plurality of positions of the filtering mechanism is to be used during the exposure period of the shutter, and means responsive to shutter operation for causing the filter mechanism to assume the predetermined position prior to exposure.

8. In a reflex camera mechanism, a casing, a lens, means for supporting a photo-sensitive surface in the focal plane of the lens, a shutter adjacent the lens, a viewing means having a reflector movable between a normal position intercepting light between the lens and focal plane and a position in which it does not so intercept the light and in which it seals the casing against entry of light through the viewing means, a light trap movable between a normal closed position intercepting light between the lens and the focal plane and an open position allowing light to pass from the lens to the focal plane, said light trap being independent of said reflector, and means coordinating movements of the reflector and light trap so that the light trap is constrained to open only after the reflector has moved from its normal to its sealing position.

9. In a reflex camera mechanism, a casing, a lens, means for supporting a photo-sensitive surface in the focal plane of the lens, a shutter adjacent the lens, a viewing means having a reflector movable between a normal position intercepting light between the lens and focal plane and a position in which it does not so intercept the light and in which it seals the casing against entry of light through the viewing means, a light trap movable between a normal closed position intercepting light between the lens and the focal plane and an open position allowing light to pass from the lens to the focal plane, said light trap being independent of said reflector, and means coordinating movements of the reflector and light trap so that the light trap is constrained to open only after the reflector has moved from its normal to its sealing position and so that the reflector is constrained to move from its sealing to its normal position only after the light trap has closed.

10. In a reflex camera mechanism, a casing, a lens, means for supporting a photo-sensitive surface in the focal plane of the lens, a shutter adjacent the lens, a viewing means having a reflector movable between a normal position intercepting light between the lens and focal plane and a position in which it does not so intercept the light and in which it seals the casing against entry of light through the viewing means, a light trap movable between a normal closed position intercepting light between the lens and the focal plane and an open position allowing light to pass from the lens to the focal plane, said light trap being independent of said reflector, and means coordinating movements of the reflector, light trap and shutter so that the light trap is constrained to open only after the reflector has moved to its sealing position, and so that the shutter opens for exposure of the sensitive surface only while the light trap is open.

11. In a reflex camera mechanism, a lens, means for supporting a photo-sensitive surface in the focal plane of the lens, a shutter, a viewing means including a reflector movable to and from a normal position intercepting light between the lens and focal plane and a non-intercepting position, a filter adjacent the lens and movable between a normal open position and a position in which it filters light at the lens side of the normal position of the reflector, and means coordinating movements of the reflector and filter so that the filter is constrained to be in its filtering position when the reflector is in its non-intercepting position and in its open position when the reflector is in normal intercepting position.

12. In a reflex camera mechanism, a lens, means for supporting a photo-sensitive surface in the focal plane of the lens, a shutter, a viewing means including a reflector movable to and from a normal position intercepting light between the lens and focal plane and a non-intercepting position, a filter adjacent the lens and movable between a normal open position and a position in which it filters light at the lens side of the normal position of the reflector, and means coordinating movements of the shutter, reflector and filter so that the filter is constrained to be in its filtering position when the reflector is in its non-intercepting position and in its open position when the reflector is in normal intercepting position, and so that the shutter is opened for exposure of the photo-sensitive surface only when the reflector and filter are respectively in their non-intercepting and filtering positions.

13. In a reflex camera mechanism, a casing, a lens, means for supporting a photo-sensitive surface in the focal plane of the lens, a shutter adjacent the lens, a viewing means having a reflector movable between a normal position intercepting light between the lens and focal plane and a position in which it does not so intercept the light and in which it seals the casing against entry of light through the viewing means, a light trap movable between a normal closed position intercepting light between the lens and the focal plane and an open position allowing light to pass from the lens to the focal plane, said light trap being independent of said reflector, a filter adjacent the lens and movable between a normal open position and a position in which it filters light at the lens side of the normal position of the reflector, and means coordinating movements of the reflector, light trap and filter so that the light trap is constrained to open only after the reflector has moved from its normal to its sealing position, and so that the filter is in normal open position when the reflector is in intercepting position and the filter is in filtering position when the light trap is open.

14. In a reflex camera mechanism, a casing, a lens, means for supporting a photo-sensitive surface in the focal plane of the lens, a shutter adjacent the lens, a viewing means having a reflector movable between a normal position intercepting light between the lens and focal plane and a position in which it does not so intercept the light and in which it seals the casing against entry of light through the viewing means, a light trap movable between a normal closed position intercepting light between the lens and the focal plane and an open position allowing light to pass from the lens to the focal plane, said light trap being independent of said reflector, a filter adjacent the lens and movable between a normal open position and a position in which it filters light at the lens side of the normal position of the reflector, means coordinating movements of the reflector and light trap so that the light trap is constrained to open only after the reflector has moved from its normal to its sealing position, and means interconnecting the light trap and the filter and causing movements of the filter to filtering position by virtue of the light trap moving to open position.

15. In a reflex camera mechanism, a lens, means for supporting a photo-sensitive surface in the focal plane of the lens, a shutter, a viewing means including a reflector movable to and from a normal position intercepting light between the lens and focal plane and a non-intercepting position, a filter adjacent the lens and movable between a plurality of positions in which it differently affects light at the lens side of the normal position of the reflector, means for predetermining which position of the filter is to be used during exposure, and means causing the filter to take its predetermined position in coordination with movement of the reflector to its non-intercepting position.

16. In a reflex camera mechanism, a casing, a lens, means for supporting a photo-sensitive surface in the focal plane of the lens, a normally open shutter adjacent the lens, a viewing means having a reflector movable between a normal position intercepting light between the lens and focal plane and a position in which it does not so intercept the light and in which it seals the casing against entry of light through the viewing means, a light trap movable between a normal closed position intercepting light between the lens and the focal plane and an open position allowing light to pass from the lens to the focal plane, means causing the reflector to move from normal position to sealing position and the light trap to move from closed to open position, and means coordinated with said last mentioned means and causing the shutter to close before the light trap is opened and the shutter to again open to expose the photo-sensitive surface after the light trap is open.

17. In a reflex camera mechanism, a casing, a lens, means for supporting a photo-sensitive surface in the focal plane of the lens, a normally open shutter adjacent the lens, a viewing means having a reflector movable between a normal position intercepting light between the lens and focal plane and a position in which it does not so intercept the light and in which it seals the casing against entry of light through the viewing means, a light trap movable between a normal closed position intercepting light between the lens and the focal plane and an open position allowing light to pass from the lens to the focal plane, said light trap being independent of said reflector, means coordinating movements of the reflector and light trap so that the light trap is constrained to open only after the reflector has moved from its normal to its sealing position, and means coordinated with said last mentioned means and causing the shutter to close before the light trap is opened and the shutter to again open to expose the photo-sensitive surface after the light trap is open.

18. The combination in an aerial camera having an objective and shutter, of reflex mechanism therefor comprising: an image reflecting mirror crossing the optical axis of the objective, and a plate adapted to receive the image reflected thereon by the mirror; a light trap positioned adjacent the non-reflecting face of said mirror; said light trap comprising a swing gate; and mechanism interconnecting said reflecting mirror, said light trap gate and said shutter adapted to maintain the shutter closed until said reflecting mirror and said gate have moved out of the optical axis of said objective.

19. In a reflex camera mechanism which has a casing, a lens, means for supporting a photo-sensitive surface in the focal plane of the lens, a viewing device including a screen in a lateral wall of the casing, a reflector shaft adjacent the edge of the screen which is closest to the focal plane, said shaft being substantially parallel to the screen and to the focal plane, and a reflector, the combination of a reflector carrier mounted to swing about the shaft and normally extending in a direction from the shaft diagonally across the optical axis between the lens and focal plane, and movable from that position to a position substantially paralleling the screen, the reflector being slidable on the carrier to and from the shaft, and a link pivotally connected to the casing and to the reflector and causing the reflector to move on the carrier toward the shaft as the carrier and reflector move toward the screen.

20. In a reflex camera mechanism which has a casing, a lens, means for supporting a photo-sensitive surface in the focal plane of the lens, a viewing device including a screen in a lateral wall of the casing, a reflector shaft adjacent the edge of the screen which is closest to the focal plane, said shaft being substantially parallel to the screen and to the focal plane, and a reflector, the combination of a reflector carrier mounted to swing about the shaft and normally extending in a direction from the shaft diagonally across the optical axis between the lens and focal plane, and movable from that position to a position substantially paralleling the screen, the reflector being slidable on the carrier to and from the shaft, and means causing the reflector to move on the carrier toward the shaft as the carrier and reflector move toward the screen.

21. In a reflex camera mechanism which has a casing, a lens, means for supporting a photo-sensitive surface in the focal plane of the lens, a viewing device including a screen in a lateral wall of the casing, a reflector shaft adjacent the edge of the screen which is closest to the focal plane, said shaft being substantially parallel to the screen and to the focal plane, and a reflector mounted to swing about the shaft and having a normal position extending in a direction from the shaft diagonally across the optical axis between the lens and focal plane, the combination of a light trap comprising two parts, one part mounted to swing about the reflector shaft, and the other part mounted to swing about an axis parallel to the reflector shaft and located at the opposite side of the optical axis from the reflector shaft.

22. In a reflex camera having a casing, a lens, means for supporting a photo-sensitive surface in the focal plane of the lens, the combination of a two-part light trap normally lying in a plane extending diagonally across the optical axis between the lens and focal plane, one part of the light trap being mounted to swing about an axis located adjacent the edge of that part which is closest to the focal plane, and the other part of the light trap being mounted to swing about a parallel axis located adjacent the edge of that part which is furthest from the focal plane.

WILLIAM T. JOCHUM.